United States Patent [19]

Vidwans et al.

[11] Patent Number: 4,854,642
[45] Date of Patent: Aug. 8, 1989

[54] HEAD RESTRAINT GUIDE ASSEMBLY

[75] Inventors: Mohan P. Vidwans, Saline; Kenji Ino, Birmingham, both of Mich.

[73] Assignee: Hoover Universal, Inc., Ann Arbor, Mich.

[21] Appl. No.: 144,377

[22] Filed: Jan. 15, 1988

[51] Int. Cl.⁴ ............................................. A47C 7/36
[52] U.S. Cl. .................................. 297/410; 297/391; 403/322
[58] Field of Search ............... 297/408, 409, 391, 410, 297/403; 24/633, 642; 248/188.5, 326; 403/322, 108

[56] References Cited

U.S. PATENT DOCUMENTS

| | | |
|---|---|---|
| 3,498,672 | 3/1970 | Leichtl . |
| 3,512,832 | 5/1970 | Kage . |
| 3,512,833 | 5/1970 | Sugiura . |
| 3,542,429 | 11/1970 | Inoue ................... 297/410 |
| 3,563,603 | 2/1971 | D'Aprile ............... 297/410 |
| 3,572,834 | 3/1971 | Herzer et al. . |
| 3,904,241 | 9/1975 | Makinen ............ 297/410 X |
| 3,979,150 | 9/1976 | Elzenbeck ............. 297/410 |
| 4,427,233 | 1/1984 | Matumoto ........... 297/410 X |
| 4,568,123 | 2/1986 | Yasui et al. . |
| 4,589,698 | 5/1986 | Suzuki ................... 297/410 |
| 4,671,573 | 6/1987 | Nemoto et al. ......... 297/410 |
| 4,674,796 | 6/1987 | Weinich et al. ..... 297/410 X |
| 4,695,095 | 9/1987 | Faust et al. ........... 297/410 |

FOREIGN PATENT DOCUMENTS 3021122 12/1981 Fed. Rep. of Germany ...... 297/408

Primary Examiner—Peter A. Aschenbrenner
Assistant Examiner—Thomas A. Rendos
Attorney, Agent, or Firm—Harness, Dickey & Pierce

[57] ABSTRACT

A head restraint assembly having a bushing member adapted for retaining and guiding a post supporting the head restraint pad of a motor vehicle seat back. The bushing is installed within the seat back and allows the head restraint pad to be positioned at various vertical positions to suit individual seat occupants. The head restraint post has a plurality of detent notches and a retainer notch. The bushing includes a detent lug engagable with the notches such that various indexed positions of the head restraint pad are provided. The detent notches of the post have ramped cam surfaces enabling the pad to be moved between the detent positions by exerting axial loads on the post. The retainer notch engages the lug to prevent inadvertent withdrawal of the head restraint pad. Complete withdrawal, however, is provided by an actuator mechanism which urges the lug to withdraw it from engagement with the post retainer notch. The release actuator includes a leaf spring element, having an end which can be depressed downwardly to exert an outward biasing force on the detent lug, causing the lug to be disengaged from the retainer notch enabling the head restraint post to be withdrawn from the head restraint.

8 Claims, 2 Drawing Sheets

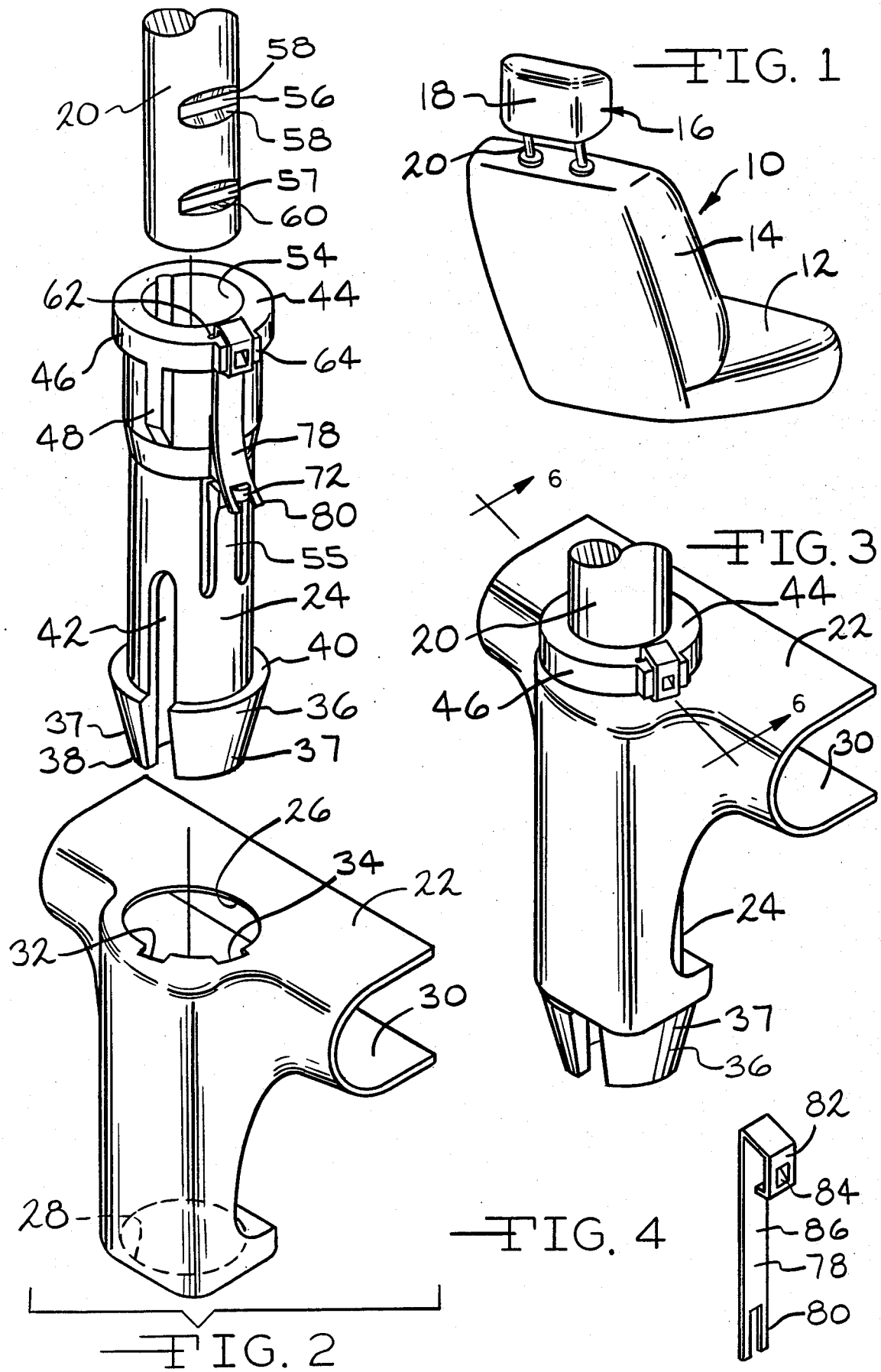

HEAD RESTRAINT GUIDE ASSEMBLY

BACKGROUND AND SUMMARY OF THE INVENTION

This invention relates to an automotive seat head restraint assembly and particularly to one that provides detents for various extended positions of the head restraint pad and includes a locking means for preventing inadvertent removal of the head restraint pad from the associated seat.

Motor vehicle manufactures provide head restraints for occupant seats as a comfort and safety feature. Heat restraints provide a surface which the seat occupants can rest their head against and also provide occupant protection by controlling rearward excursion of the occupant's head in rear impact situations.

Head restraints can be categorized as several different general types. The so-called integral head restraint or "high back" seat has a seat back with a vertical extension forming a head restraint. Another type of seat has a separate head restraint pad which frequently has a mechanism for allowing the vertical position of the pad to be adjusted and positioned for a particular seat occupant. Vertical adjustment for these types of head restraints is typically accomplished by providing one or more rods extending from the head restraint pad into the seat back, with a mechanism mounted within the seat back for allowing the position of the head restraint pad to be adjusted and set at a desired position. As a means of preventing inadvertent removal of the head restraint from the set back which could occur during adjustment, a stop or latch may be provided which limits the upward extent of adjustment of the head restraint pad. Means are further often provided for unlatching the stop to enable the head restraint pad to be removed from the seat back for vehicle repairing, servicing, retrimming, etc.

While numerous designs for head restraint assemblies of the above type are known, manufacturers of motor vehicle components are constantly striving to increase productivity by simplifying seat assembly. Moreover, there is a need to provide a head restraint mechanism having a restraint release mechanism which is inconspicuous yet easily operated. In view of the foregoing, it is an object of the present invention to provide a head restraint assembly which can be quickly and easily assembled, provides detents for various adjusted head restraint positions, which can be serviced without dismantling any components and further has a latch member which is unobtrusive.

In accordance with the present invention, a head restraint assembly is provided having a mounting bracket for attachment to the seat frame with a pair of spaced apertures through which a head restraint bushing is inserted. The head restraint bushing includes extending legs with ramp surfaces so that when the bushing is inserted into the bracket, the legs are resiliently deflected and become locked into place when the installed position is reached. The head restraint post, which is attached to the head restraint pad, passes through the bushing and has a number of notches which provide detents. A detent lug carried by the bushing engages the detent notches and is resiliently biased against the post. The detent notches are provided with cam surfaces enabling the head restraint to be raised and lowered to and past the detent positions. The lowermost notch, however, forms a retainer notch with a radial wall which prevents complete removal of the head restraint. A leaf spring actuator is used which can be depressed from outside of the seat back and acts on the detent lug to deflect it out of engagement with the detent notches, thereby enabling withdrawal of the head restraint assembly.

Additional benefits and advantages of the present invention will become apparent to those skilled in the art to which this invention relates form the subsequent description of the preferred embodiments and the appended claims, taken in conjunction with the accompanying drawings.

BRIEF DESCRIPTION OF THE DRAWINGS

FIG. 1 is a pictorial view of a motor vehicle seat of the type having a separate adjustable head restraint assembly.

FIG. 2 is an exploded pictorial view of the head restraint assembly according to the present invention.

FIG. 3 shows the head restraint assembly of FIG. 2 shown in an assembled condition.

FIG. 4 shows the pictorial view of the leaf spring actuation device according to the present invention.

DETAILED DESCRIPTION OF THE INVENTION

Figure 5:
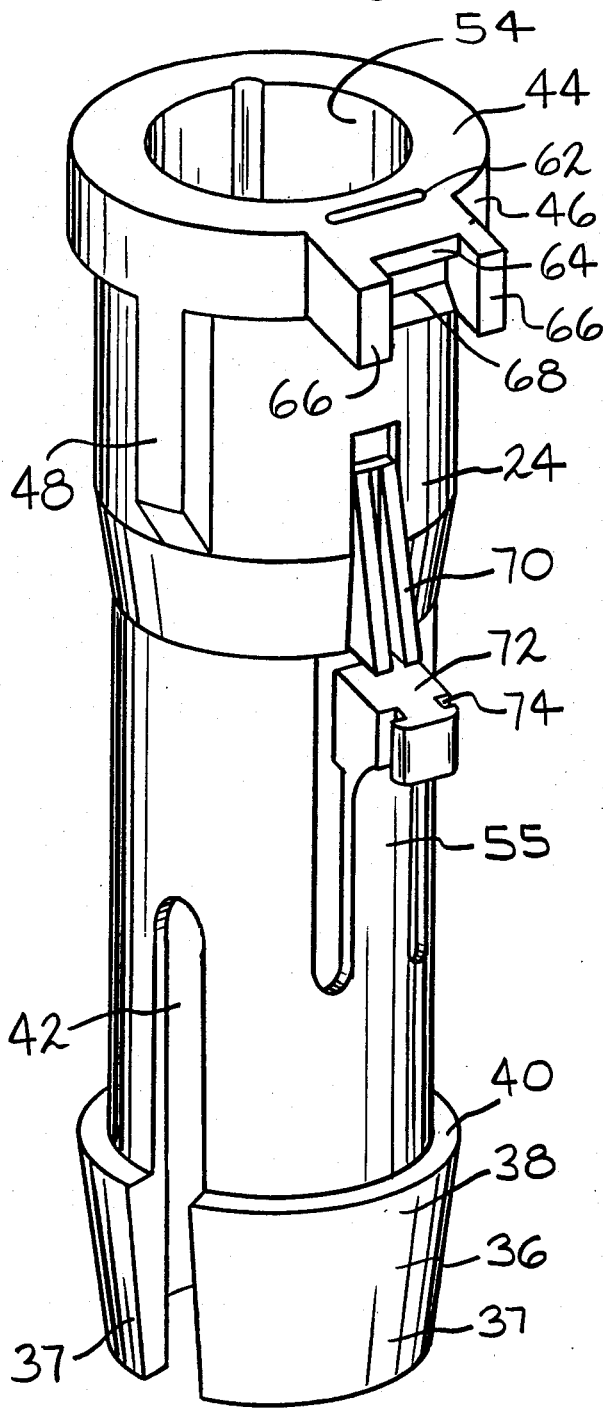
FIG. 5 is a pictorial view of the head restraint bushing according to this invention.

FIG. 1 is a pictorial view of a motor vehicle seat generally designated by reference number 10. Seat 10 includes a bottom or cushion 12 and seat back 14. Head restraint assembly 16 is carried by seat back 14 and has pad 18 and a pair of downwardly extending mounting posts 20.

FIGS. 2 through 7 provide illustrations of the mechanism used to support mounting posts 20 within seat back 14. Head restraint bracket 22 is provided to support bushing 24 within seat back 14. Head restraint bracket 22 is made from sheet metal and forms a pair of aligned generally circular apertures 26 and 28, and a forward opening generally "U" shaped channel 30 which is provided for attachment to a frame member (not shown) of seat back 14. Aperture 26 on the uppermost surface of head restraint bracket 22 is provided with a pair of angularly spaced notches 32 and 34 for proper alignment of bushing 24 to headrest rod 20.

Figure 6:
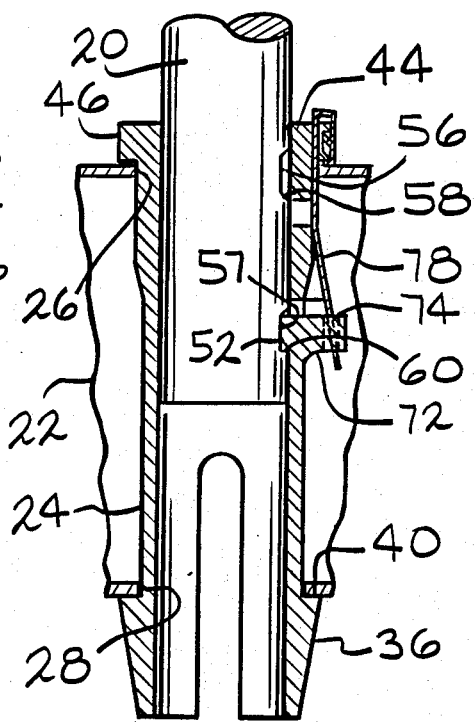
FIG. 6 is a cross-sectional view taken along line 6—6 of FIG. 3 showing the head restraint assembly with the head restraint post vertically extended causing the detent lug to engage the lowermost retainer notch of the head restraint post.

The features of bushing 24 are best explained with particular reference to FIG. 5. Bushing 24 is generally tubular in shape and has a lowermost reduced diameter end 36 with a pair of extending legs 37, each having a ramped side surface 38 and radial shoulder 40. Longitudinal slots 42 enable legs 37 to flex radially inwardly and outwardly. Upper end 44 of bushing 24 includes a radially extending flange 46 with indexing lug 48. During seat assembly, bushing 24 is inserted into head restraint bracket 22 in the direction shown in FIG. 2. As bushing 24 is inserted, ramped side surface 38 of the bushing causes legs 37 to deflect inwardly until the bushing reaches its installed position as shown in FIG. 3. Bushing 24 is locked in position since radial shoulders 40 abuts bracket 22 around aperture 28. Once installed, upper flange 46 engages the top surface of head restraint bracket 24 as shown in FIG. 6. Lug 48 fits into notch 32 to establish a predetermined rotational position of the bushing. This configuration allows bushing 24 to be easily installed into seat back 14 at any one of numerous stages of seat assembly.

In accordance with a principal aspect of this invention, head restraint bushing 24 further defines engaging lug 52 which projects into bushing bore 54. Detent lug 52 is resiliently biased by a strip of material 55 forming the bushing such that the detent lug is supported in cantilever fashion. Detent lug 52 is configured such that it normally projects into bore 54 as shown in FIG. 6, but is capable of limited radially outward movement. Head restraint mounting post 20 includes a number of regularly spaced detent notches 56 along the post as shown in FIG. 2. the lowermost of the notches is a retainer notch 57 which forms a radially extending lower wall 60, whereas detent notches 56 include ramp surfaces 58 along both their upper and lower walls.

During assembly, when post 20 is inserted into bushing bore 54, detent lug 52 is urged radially outwardly to permit the post to be moved longitudinally within the bore. Lug 52, however, engages each of notches 56 to provide a detent at indexed positions of insertion of the post. Ramp surfaces 58 allow the post to be moved by pushing or pulling on the post. Complete withdrawal of posts 20 from bushing 22, however, is prevented due to radial wall 60.

In accordance with another principal feature of this invention, head restraint assembly 16 is provided with means for enabling complete removal of post 20 from bushing 22 while preventing inadvertent removal. Bushing upper flange 46 defines slot 62 and release actuator retention boss 64. Boss 64 has a pair of walls 66 with inwardly extending slot 68. Bushing 22 further defines ramp 70 directly below boss 64 and aligned with detent lug 52. The radially outer surface of detent lug 52 forms a head 72 with channels 74, as best shown in FIG. 5.

Release actuator 78 is preferably formed from sheet metal and includes a lower forked end 80, body portion 86, and a curled top 82 having an inwardly deflected tab 84. Release actuator 78 is mounted as shown in FIG. 2 with the body portion 86 extending through slot 62 such that forked end 80 engages detent lug channels 74. Curled top 82 wraps around boss 64 and is retained in position through engagement between tab 84 and slot 68. The engagement between slot 68 and tab 84, however, provides for a limited range of vertical movement of release actuator 78.

Figure 7:
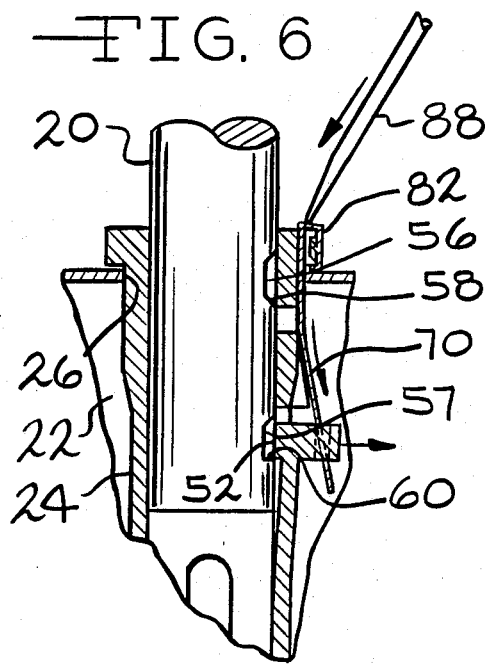
FIG. 7 is a cross-sectional view similar to FIG. 6, except showing the detent lug being withdrawn from engagement with the retainer notch thereby enabling the head restraint pad to be removed from the seat.

Operation of release actuator 78 will be explained with reference to FIGS. 6 and 7. As shown in FIG. 6, in the normal installed position, release actuator 78 is deflected such that its forked end 80 is positioned radially outboard of the remainder of the release actuator. During normal adjustments of the position of head restraint pad 18, release actuator 78 is resiliently deflected as detent lug 52 is also deflected while moving into and out of engagement with notches 56. As previously mentioned, complete withdrawal of post 20 is inhibited by the configuration of retainer notch 57 by engagement between detent lug 52 and wall 60. for servicing or other purposes, when complete removal of head restraint pad and post 20 is desired, release actuator 78 provides a means for withdrawing detent lug 52 from engagement from retainer notch 57. The release actuator leaf spring also assists the plastic spring in maintaining detents in the rod 20. As shown in FIG. 7, a downward force is applied to curled top 82 of release actuator 78 by a tool such as a screw driver 88, and causes the release actuator to move downwardly along ramp 70 which results in a radially outward force being applied on detent lug 52, due to the outboard positioning of detent head channels 74 and also due to strategic positioning of ramps 70. This force causes detent lug 52 to move out of engagement with retainer notch wall 60, thereby permitting complete withdrawal of the head restraint post 20.

The positioning of bushing 24 may be such that it is completely enclosed by the outer covering trim, or flange 46 may be exposed forming a visible escutcheon.

For vehicle seat designs using more than one post 20, such as shown in FIG. 1, an identical head restraint assembly of the type described above may be used for each. Alternately, one of the post receiving bushings may act merely as a guide without providing detents or means to prevent inadvertent withdrawal.

While the above description constitutes the preferred embodiments of the present invention, it will be appreciated that the invention is susceptible to modification, variation and change without departing from the proper scope and fair meaning of the accompanying claims.

We claim:

1. An assembly for enabling a head restraint pad to be moved with respect to a motor vehicle seat comprising:
   at least one post connected to and supporting the head restraint pad, said post forming a retainer notch on its outer surface,
   a tubular bushing mounted to the seat and having an inside bore for receiving said post,
   latch means coupled to said tubular bushing having a lug engagable with said retainer notch and biased into engagement with said retainer notch for inhibiting the withdrawal of said post from said bushing, and
   a release member having a body section with a first end engaging said lug, and a second end extending from one end of said bushing, wherein said release member second end is depressed against said one end of said bushing, said first end of said release member produces compressive loading of said lug and causes said lug to be displaced out of engagement with said retainer notch enabling said post to be withdrawn from said bushing, said bushing forming a ramp surface acting on said release member to position said first end radially outward of said second end, whereby when said second end is depressed said body section is loaded in compression and said first end is urged to move radially outward.

2. An assembly for enabling a head restraint pad to be moved with respect to a motor vehicle seat comprising:
   at least one post connected to and supporting the head restraint pad, said post forming a retainer notch on its outer surface,
   a tubular bushing mounted to the seat and having an inside bore for receiving said post,
   latch means coupled to said tubular bushing having a lug engagable with said retainer notch and biased into engagement with said retainer notch for inhibiting the withdrawal of said post from said bushing, and a release member having a body section with a first end engaging said lug, and a second end extending from one end of said bushing, wherein said release member second end is depressed against said one end of said bushing, said first end of said release member produces compressive loading of said lug and causes said lug to be displaced out of engagement with said retainer notch enabling said post to be withdrawn from said bushing, said one end of said bushing forming a boss for retaining said release member and said release member second end is curled to engage said boss.

3. A head restraint assembly for enabling a head restraint pad to be moved vertically with respect to a motor vehicle seat back comprising:

a post connected to and supporting the head restraint pad, said post forming a retainer notch on its outer surface, a tubular bushing mounted to said seat back having an inside bore for receiving said post and forming a radially outward flange at one end thereof having a longitudinal slot, said bushing further integrally forming a cantilever strip supported at one end with a free end projecting toward said flange and forming a lug engagable with said retainer notch, and a release member for causing said lug to be displaced away from engagement with said retainer notch enabling said post to be withdrawn from said bushing, said release member formed from sheet metal and having a first end engaging said lug and a curled second end engaging said flange with a body section extending through said flange slot, wherein when said second end is depressed against said flange, said first end causes said lug to be displaced out of engagement with said retainer notch thereby enabling said post to be withdrawn from said bushing.

4. A head restraint assembly as in claim 3 wherein said post forms a plurality of detent notches engagable by said lug and located between said retainer notch and said head restraint pad, said detent notches having cam surfaces causing said lug to be moved out of engagement with said detent notches when axial loads are exerted on said post.

5. A head restraint assembly as in claim 3 wherein said bushing forms a ramp surface acting on said release member to position said first end radially outward of said second end, whereby when said second end is depressed said body section is loaded in compression and said first end is urged to move radially outward.

6. A head restraint assembly as in claim 3 wherein said bushing includes a second end opposite said one end having a conical surface enabling said bushing to be loaded into a head restraint bracket whereby said conical end compresses radially during loading and thereafter expands to lock said bushing in place.

7. A head restraint assembly for enabling a head restraint pad to be moved vertically with respect to a motor vehicle seat back comprising:

a post connected to and supporting the head restraint pad, said post forming a retainer notch on its outer surface, a head restraint mounting bracket having upper and lower aligned apertures, a tubular bushing having an inside bore for receiving said post and forming a radial outwardly projecting flange at its upper end, and a conical end lower end with longitudinal slots forming legs which can be radially displaced toward each other such that said bushing can be inserted into said mounting bracket apertures and retained therein through engagement between said legs and said lower aperture, latch means coupled to said tubular bushing having a lug engagable with said retainer notch and said lug biased into engagement with said retainer notch for inhibiting the withdrawal of said post from said bushing, and a release member having a body section with a first end engaging said lug, and a second end extending from said flange, wherein said release member second end is depressed against said upper end of said bushing, said first end of said release member produces compressive loading of said lug and causes said lug to be displaced out of engagement with said retainer notch enabling said post to be withdrawn from said bushing, said bushing forming a ramp surface acting on said release member to position said first end radially outward of said second end, whereby when said second end is depressed said body section is loaded in compression and said first end is urged to move radially outward.

8. A head restraint assembly for enabling a head restraint pad to be moved vertically with respect to a motor vehicle seat back comprising:

a post connected to and supporting the head restraint pad, said post forming a retainer notch on its outer surface, a head restraint mounting bracket having upper and lower aligned apertures, a tubular bushing having an inside bore for receiving said post and forming a radial outwardly projecting flange at its upper end, and a conical end lower end with longitudinal slots forming legs which can be radially displaced toward each other such that said bushing can be inserted into said mounting bracket apertures and retained therein through engagement between said flange and said lower aperture, latch means coupled to said tubular bushing having a lug engagable with said retainer notch and said lug biased into engagement with said retainer notch for inhibiting the withdrawal of said post from said bushing, and a release member having a body section with a first end engaging said lug, and a second end extending from said flange, wherein said release member second end is depressed against said upper end of said bushing, said first end of said release member produces compressive loading of said lug and causes said lug to be displaced out of engagement with said retainer notch enabling said post to be withdrawn from said bushing, said flange of said bushing forming a boss for retaining said release member and said release member second end is curled to engage said boss.

* * * * *